United States Patent [19]

Smith

[11] 3,926,302

[45] Dec. 16, 1975

[54] MATERIAL HANDLING AND CONVEYING DEVICE

[75] Inventor: Gordon C. Smith, Richfield, Ohio

[73] Assignee: Glaus, Pyle, Schomer, Burns & DeHaven, Inc., Akron, Ohio

[22] Filed: Aug. 2, 1973

[21] Appl. No.: 385,088

[52] U.S. Cl................ 198/53 R; 110/109; 198/221; 214/34
[51] Int. Cl.²................... B65G 47/18; B65G 25/08
[58] Field of Search.......... 198/218, 221, 226, 53 R, 198/54, 59; 110/109; 214/23, 34

[56] References Cited
UNITED STATES PATENTS

| | | | |
|---|---|---|---|
| 3,088,577 | 5/1963 | Chamberlin | 198/218 |
| 3,265,195 | 8/1966 | Ford | 198/221 |
| 3,473,645 | 10/1969 | Kidd | 198/221 |
| 3,477,649 | 11/1969 | Dalberg et al. | 241/29 |
| 3,584,735 | 6/1971 | Daugherty | 198/218 |
| 3,667,627 | 6/1972 | Martin et al. | 198/221 |

Primary Examiner—James B. Marbert
Assistant Examiner—Jeffrey V. Nase
Attorney, Agent, or Firm—Hamilton, Renner & Kenner

[57] ABSTRACT

An apparatus for transferring or conveying refuse or other materials is disclosed herein as used in conjunction with a refuse disposal system. Normal refuse is dumped into a pit or storage area at the bottom of which is located the conveying apparatus. Large or extremely bulky refuse can be first transferred to a shearing device and then dropped into the pit onto the conveyor. The conveyor includes a plurality of superimposed upwardly inclined pusher rams which are individually operable as by hydraulic cylinders. The rams include a pusher plate mounted on a movable enclosed carriage. A cover deck guards each ram in its retracted position. Means are provided to readily remove each ram assembly without disturbing the overall continuity of the system in the event repair or replacement is needed.

9 Claims, 10 Drawing Figures

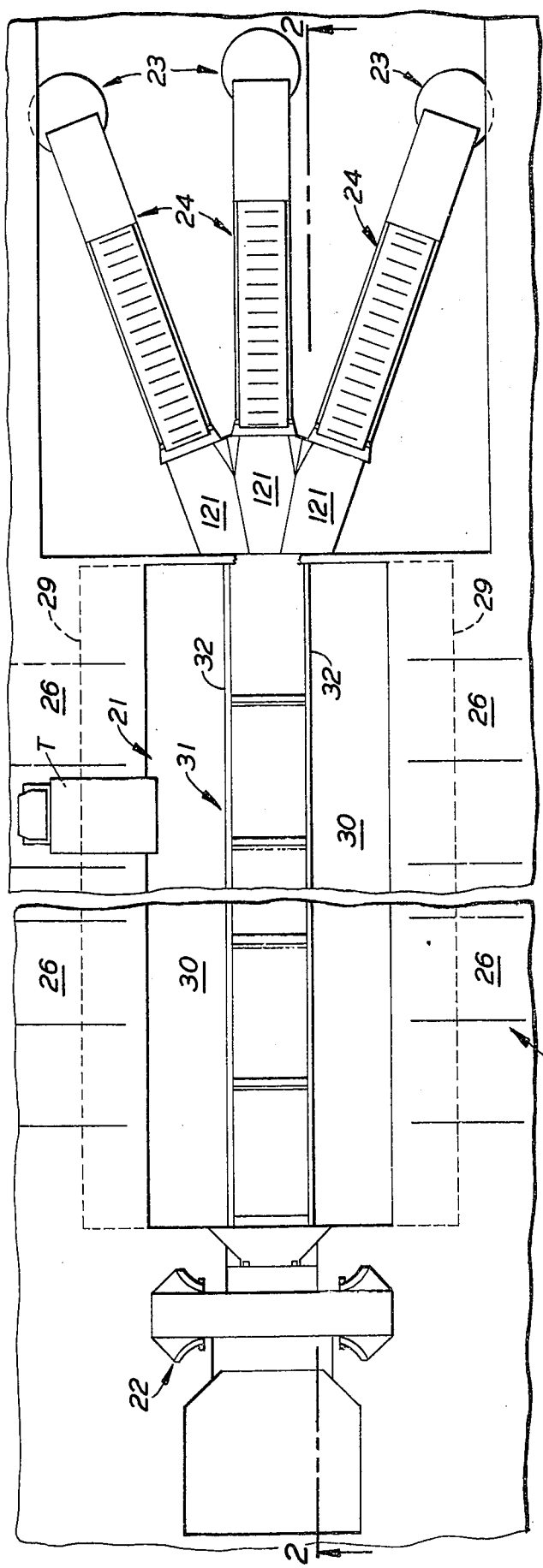
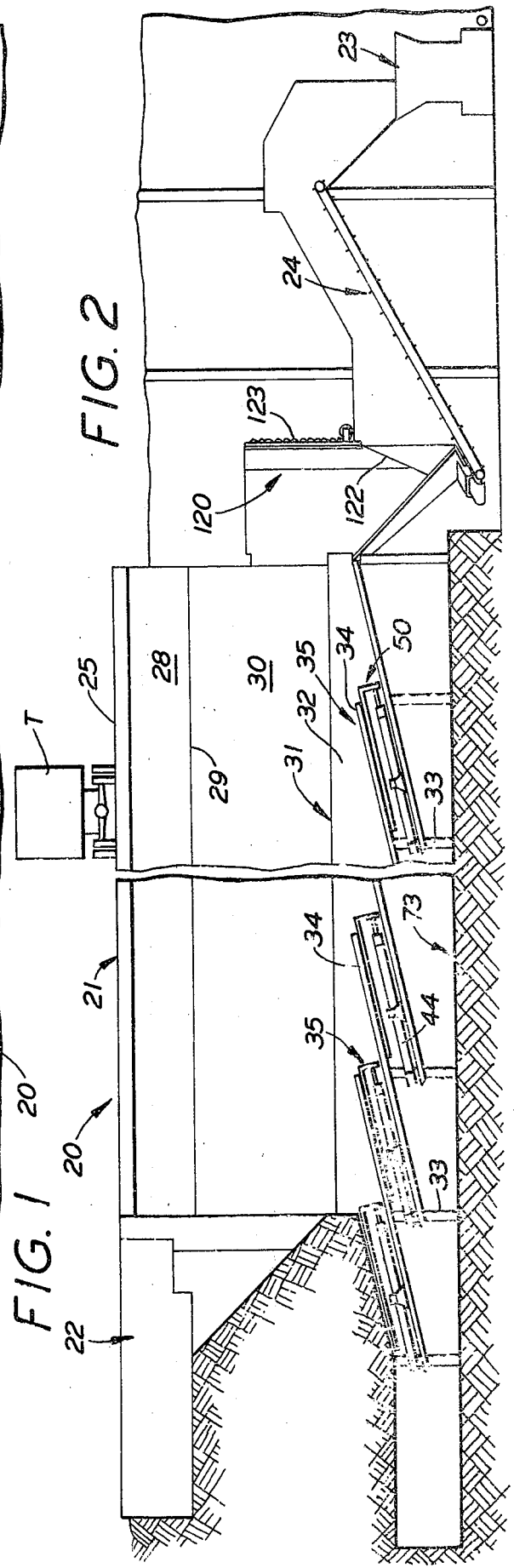

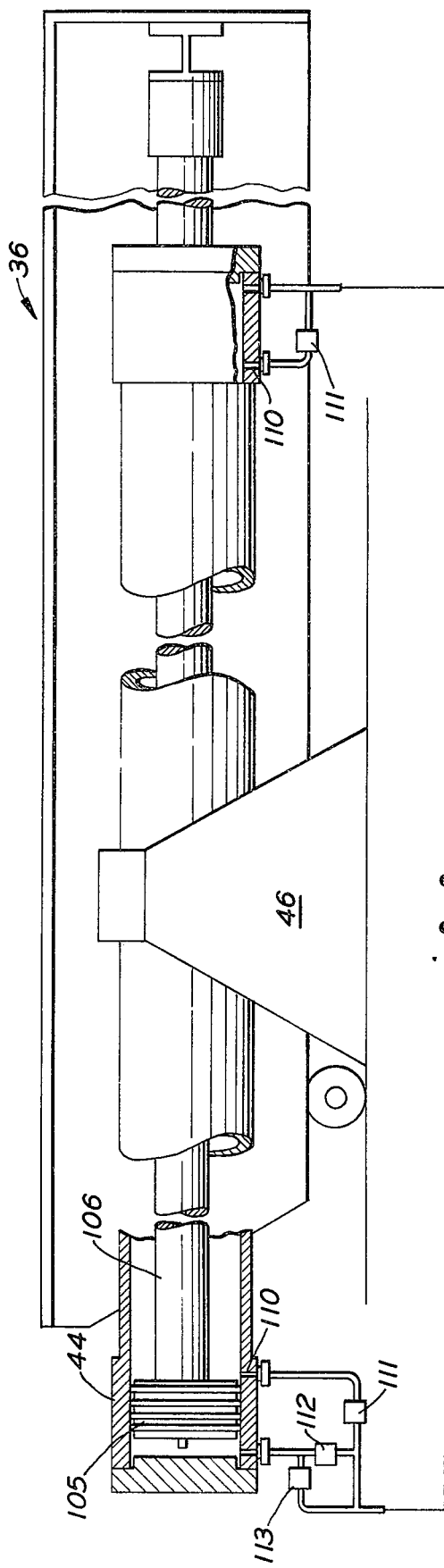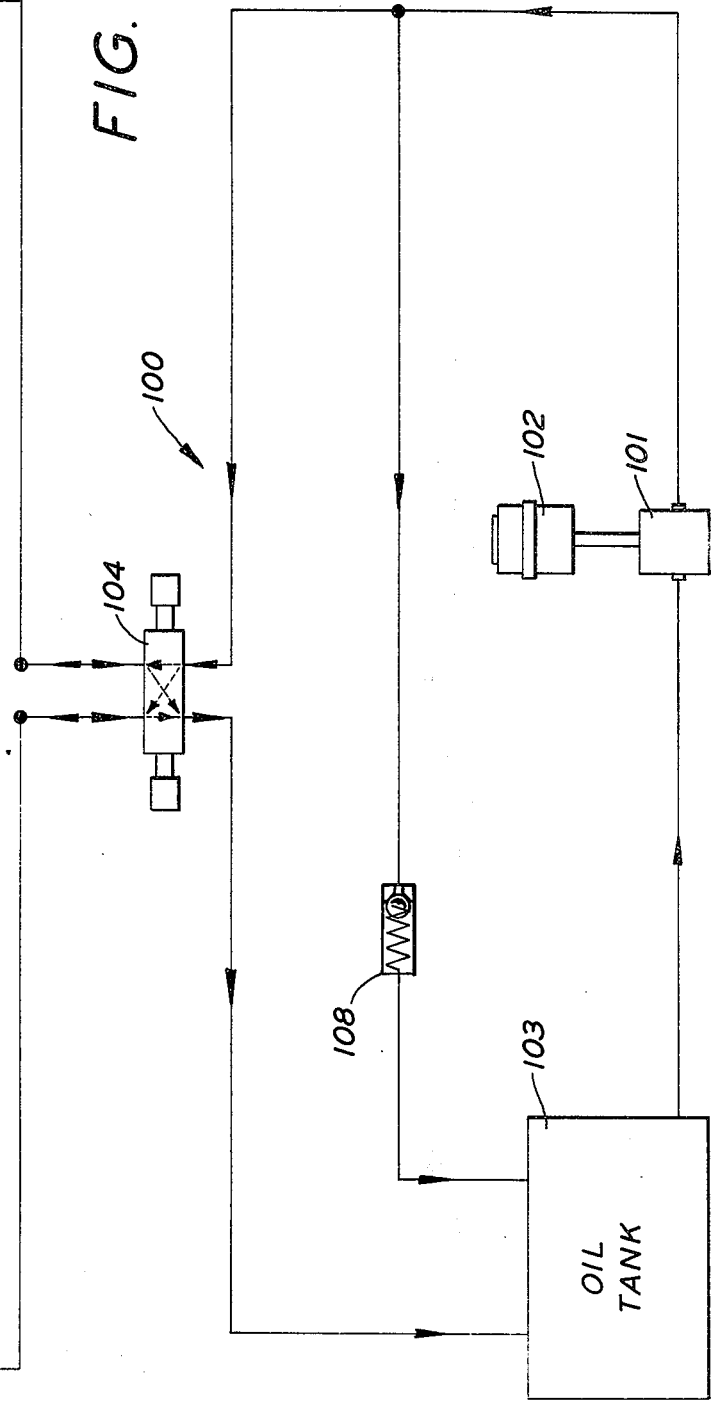
FIG. 7

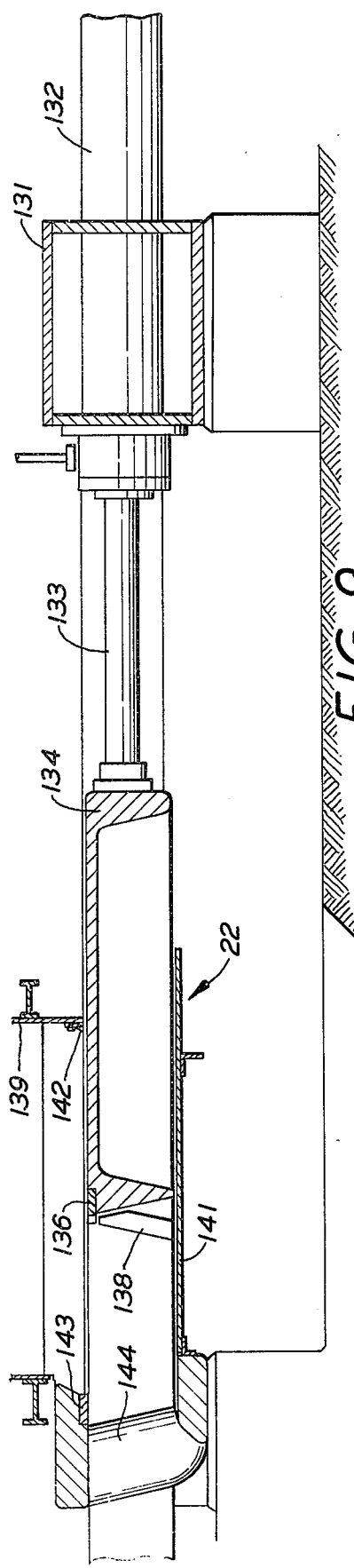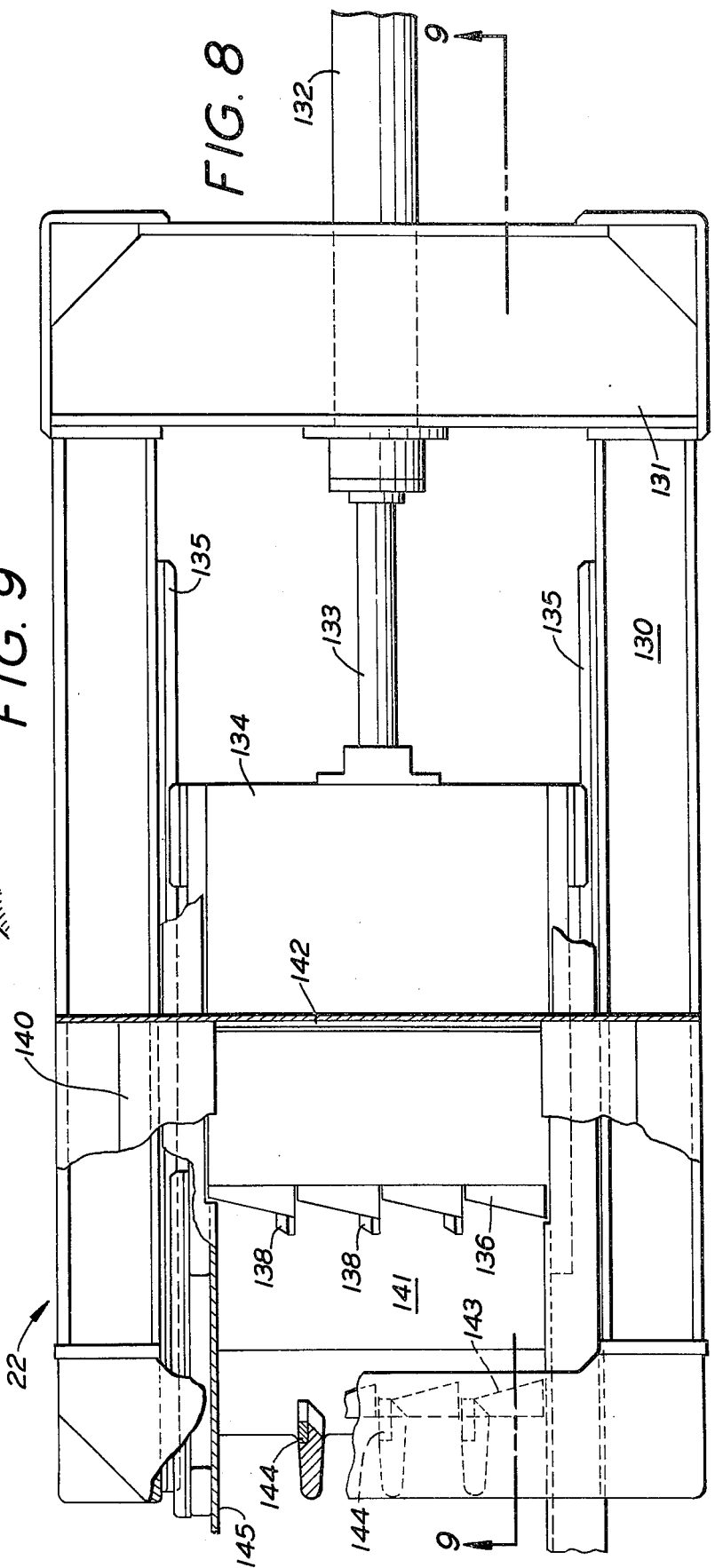

MATERIAL HANDLING AND CONVEYING DEVICE

BACKGROUND OF THE INVENTION

This invention relates to a refuse or material handling system. More particularly, this invention relates to a feed conveyor system which, in one application, is situated in a refuse or material storage pit. Such a pit, if for refuse, is often part of a total refuse handling system including shears, shredders and furnaces.

Modern urban installations designed to receive, shred and burn municipal and industrial refuse usually work under a format wherein refuse is received only during a small fraction of a day, with the shredding and burning being spread out over essentially the entire day. Such a continuous incineration process enables the system to produce steam for heating and industrial use as an end product. However, because it is highly important to maintain the process continuous, particularly so that it is never necessary to shut down and later restart the refuse burning operation, an extremely large refuse storing pit must be provided in the system. This pit would therefore be capable of receiving in a few hours the daily municipal refuse quantity, which refuse is thereafter supplied to the shredders and furnaces at a controlled rate to assure continuous operation. The manner in which the refuse is transferred or fed from the storage pit to the shredding system must be highly reliable as a failure thereof would result in the undesirable shutdown of the entire system. In addition, the feeder system must be capable of operation and periodic maintenance in situations where the pit is full of tons of refuse, for it would generally be very impractical to empty an entire pit to service an inoperable feed system.

In some presently existing installations, the refuse pit is unloaded by one or more overhead cranes which pick up the material and transfer it to the shredders. This system not only requires a great deal of manpower but is also plagued with high maintenance requirements. In addition, under this method the first refuse in the pit is often the last refuse out of the pit which is highly undesirable.

Some existing refuse pits have been provided with several long apron conveyors to pull refuse out of the bottom thereof. In order for this system to properly evacuate the bottom of the pit, these conveyors must be quite close together rendering it difficult to maintain the same from the underside. In addition, these types of conveyors are quite susceptible to damage from heavy objects being dropped thereon and thus pits utilizing the same cannot be deep enough for ample storage.

In other systems, rather than utilize a pit to hold the refuse, a large concrete floor receives the material with front end loaders or the like being used to push the material onto conveyors leading to the shredders. This method also is costly in manpower and requires a great deal of area for floor space inasmuch as the refuse cannot be stacked too high. Thus, this system approaches efficiency only in small volume situations.

Other known conveyor systems are simply not adaptable for use in the environment of a storage pit or refuse handling in general. It is important to provide a consistent rate of flow of the material which is often quite heavy. Conventional apron or chain drag conveyors are not practical for large pits or long distances because of the tension which must be maintained on the drive chains thereof.

Most practical for refuse handling are shuffle type conveyors in which a number of rams reciprocate to push the material along bit by bit. The reciprocating rams of existing conveyors are tied together and their motion coordinated to the extent that a mechanical failure somewhere in the system usually means that the entire system must be shut down for repair. In addition, such conveyor systems are not practical inasmuch as their operation is the same regardless of whether peak load or slight load conditions exist. Finally, such conveyors do not lend themselves to the facile addition of more capacity, should that become desirable.

SUMMARY OF THE INVENTION

It is thus an object of the present invention to provide an apparatus for conveying refuse or other material at a preset, controlled and continuous rate.

It is another object of the present invention to provide an apparatus, as above, having individually operated pusher members such that some of the members may be rendered inoperative during small volume periods or for maintenance, and in addition pusher synchronizing and speeds can be varied to create different patterns and speeds of material travel.

It is still another object of the present invention to provide an apparatus, as above, which will convey a large volume of material during peak operations and which is readily capable of being expanded to increase capacity, as necessary.

It is yet another object of the present invention to provide an apparatus, as above, which can be situated near the bottom of a storage pit or container so that the first material in the pit is the first material removed therefrom.

It is a further object of the present invention to provide an apparatus, as above, which will withstand the pressures and forces of heavy objects resting upon or striking the same.

It is another object of the present invention to provide an apparatus, as above, which is operated by a unique hydraulic system.

It is a still further object of the present invention to provide an apparatus, as above, which is highly suitable for use in the environment of a refuse disposal system to receive refuse materials from trucks, shears or the like.

It is an additional object of the present invention to provide a refuse disposal system, as above, with a unique shearing apparatus which will break down larger objects prior to transferring the same to the conveyor described above.

These and other objects of the present invention which will become apparent from the description to follow, are accomplished by the improvements hereinafter described and claimed.

In general, an apparatus for conveying material is shown in the environment of a waste disposal system having a shear to reduce the size of large refuse material, a pit to store the refuse material during periods of peak loading, and a shredder for preparing the refuse for incineration. The conveyor resides generally in the bottom of the pit and transfers refuse dumped thereon or received from the shear to the shredding area.

The conveyor includes a plurality of ram assemblies superimposed on each other and mounted angularly upwardly toward the shredder area. Each ram assembly includes a movable carriage which has a pusher plate thereon for moving refuse to the adjacent ram assembly. Each pusher plate is moved by a hydraulic cylinder mounted below a cover plate. Means are provided to guide the carriage as it is moved by the cylinder. Means can also be provided to extinguish fires in the pit area which often occur when smoldering refuse is dropped therein.

BRIEF DESCRIPTION OF THE DRAWINGS

FIG. 1 is a foreshortened plan view of a refuse disposal system utilizing the conveying apparatus according to the concept of the present invention.

FIG. 2 is a sectional view taken substantially along line 2—2 of FIG. 1.

FIG. 7 is a schematic diagram of the hydraulic system for a ram assembly.

FIG. 8 is a plan view of a hydraulic shear used in conjunction with the refuse disposal system.

FIG. 9 is a sectional view taken substantially along line 9—9 of FIG. 8.

DESCRIPTION OF THE PREFERRED EMBODIMENT

Figure 3:
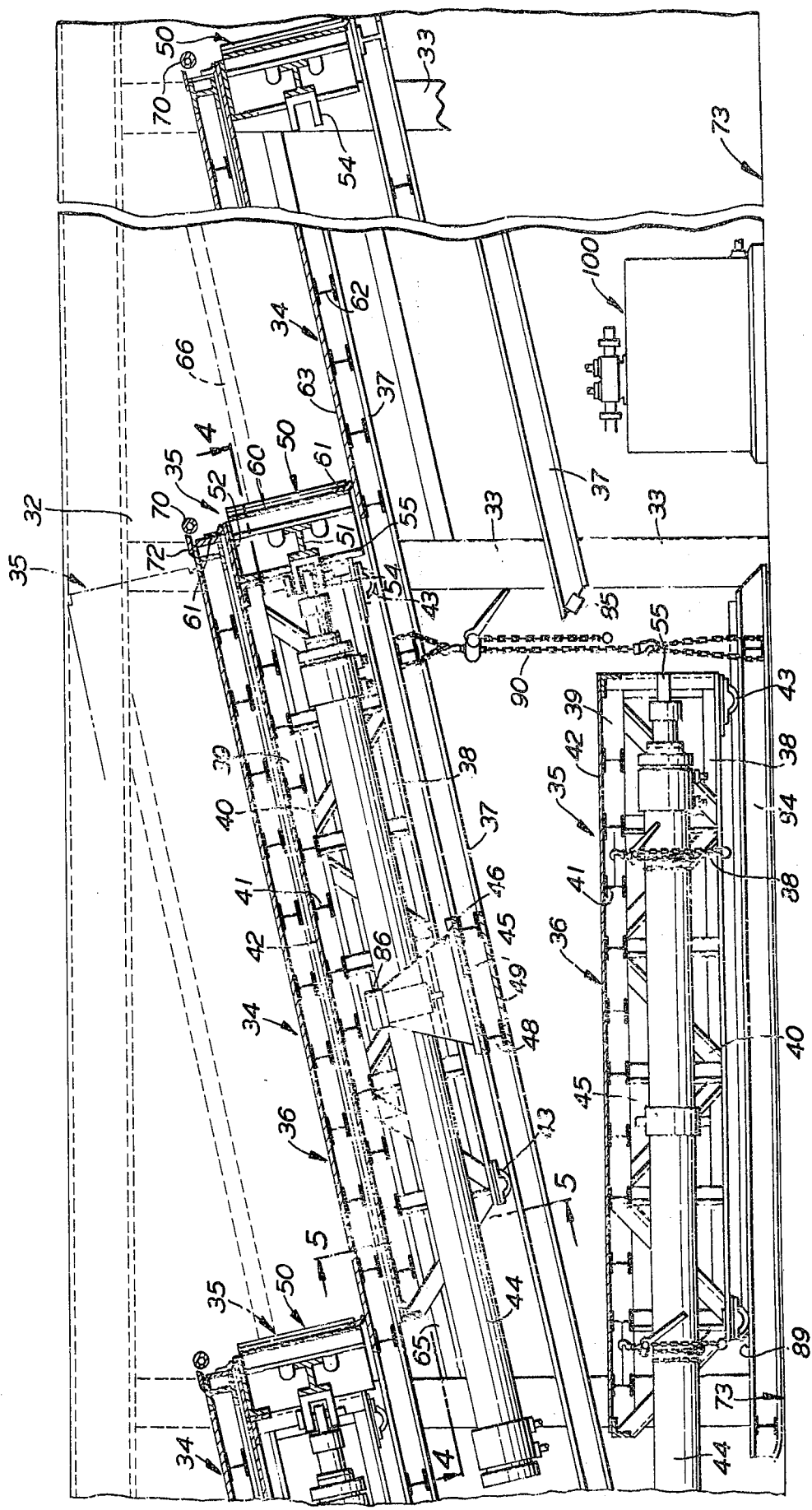
FIG. 3 is an enlarged detail drawing showing a ram assembly according to the concept of the present invention.

A system for handling industrial and municipal refuse is indicated generally by the numeral 20 in FIG. 1 and includes a pit indicated generally by the numeral 21 representing a receiving and storing station for the refuse, a shear station indicated generally by the numeral 22 for reducing the size of large articles prior to placing the same in the pit 21, a plurality of shredders 23 which tear or otherwise period grind the refuse preparatory to incineration, and a plurality of conveyors 24 which transfer the refuse from the pit 21 to the shredders 23. A complete refuse handling system would include a furnace which would receive material from the shredders 23 and burn the same to produce useful products such as steam or the like. Such a furnace can be a completely conventional item and is therefore not shown herein.

The pit 21 includes at the top thereof a truck unloading floor 25 which can be divided into a plurality of bays 26 where a conventional refuse packer truck T can be unloaded. The pit 21 is essentially of a width defined by the internal edges of the unloading floor 25 but can be made somewhat wider internally to accommodate a larger volume of refuse by designing a portion of the unloading floor 25 as an overhang. Thus, as shown in FIGS. 1 and 2, the pit can first have angularly divergent walls 28 leading to a point 29 of greatest width and then include walls 30 which converge toward a trough indicated generally by the numeral 31 near the bottom of pit 21.

The lateral extent of trough 31 is defined by two vertically oriented side plates 32 which, as can be seen in FIG. 2, are saw-toothed in shape and are supported by columns or stanchions 33. Refuse dropped in pit 21 will usually slide down walls 30 toward trough 31 and rest on a portion of a plurality of angularly mounted support members generally indicated by the numeral 34 and somewhat schematically shown in FIG. 2. Support members 34, the details of which will be hereinafter described, are likewise supported by columns 33 at an angle of about 12° from horizontal.

Each support member 34 includes a first portion which receives the material and which acts as a cover plate and a second portion which acts as a support plate for adjacent of a series of pusher assemblies or units indicated generally by the numeral 35 which together form a live bottom for pit 21 and represent a means to transfer the refuse material from the bottom of pit 21 at a controlled rate. Each pusher assembly includes a rigidly constructed movable carriage 36 consisting of lower side beams 38 and upper side beams 39 separated by structural supporting latticework 40. Fixed above and extending between beams 39 are a series of laterally extending I-beams 41 which support a cover plate 42. When the pusher 35 is in its extended position, as shown in the chain lines of FIG. 3, the plate 42 protects the carriage 36 and other components from falling refuse. Lower beams 38 support wheels 43 which during movement of carriage 36 ride on support beams 37 which extend along the entire length of each side of support member 34.

The power to move each carriage 36 is derived from a stationary hydraulic cylinder 44 which is trunnion mounted, as at 45, to a pedestal 46 within carriage 36. I-beams 48 and cover plates 49 extending between beams 37 provide extra support for the pedestal 46 and cylinder 44. The thrust from cylinders 44 is thereby transferred to the stanchions 33.

Figure 4:
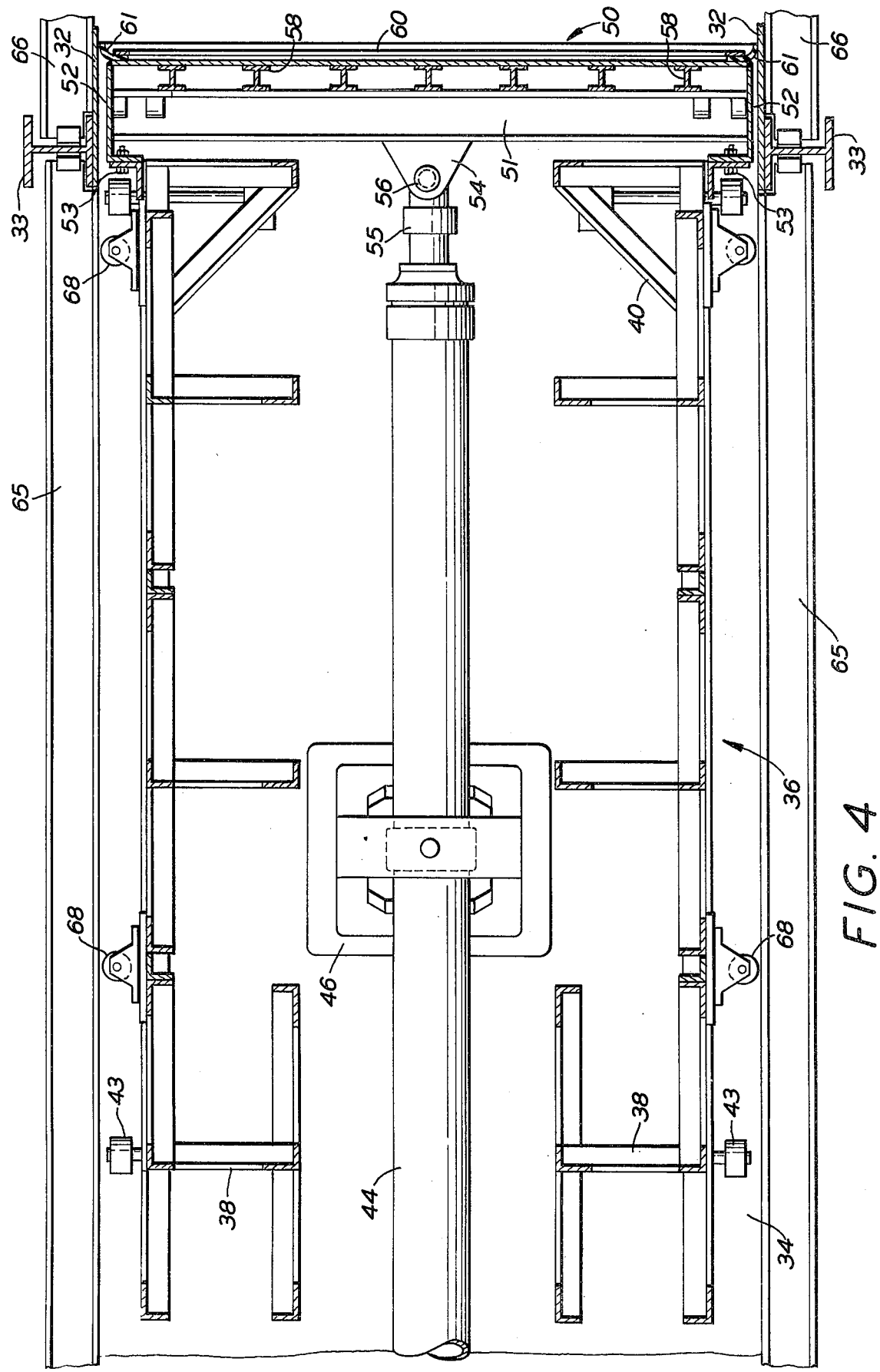
FIG. 4 is a sectional view taken substantially along line 4—4 of FIG. 3.
Figure 5:
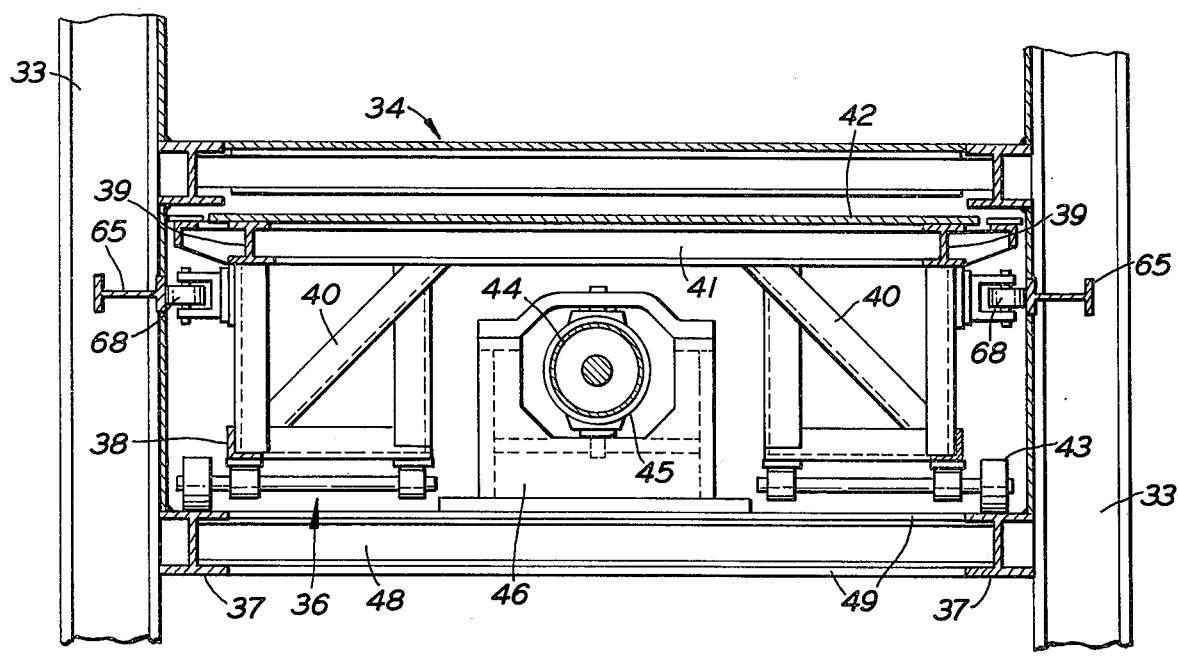
FIG. 5 is a sectional view taken substantially along line 5—5 of FIG. 3.

The pusher head assembly is indicated generally by the numeral 50 and is best shown in FIGS. 3 and 4. A cross beam 51 has side plates 52 attached thereto which are fixed, as by bolts 53, to carriage 36. A clevis 54 is adapted to receive the head 55 of the piston rod of cylinder 44 which is connected thereto as by pin 56. A series of I-beams 58 are fixed to cross beam 51 and support a heavy metallic pusher face 60. Replaceable fabric reinforced rubber seal strips 61 are provided between the face 60 and member 34 (FIG. 3) and between face 60 and plates 32 (FIG. 4). Similar strips of fabric can also be provided along the length of face 60.

In the retracted position of carriage 36, the bottom of trough 31 is maintained closed by virtue of the exposed portion of support members 34 which include, in the area which would be exposed to refuse, supporting I-beams 62 and cover plate or deck 63 extending between beams 37. Upon actuation of cylinder 44 the head assembly 60 is moved along plate 63 of support member 34 and, of course, carriage 36 with its cover plate 42 is carried with it to the chain line position in FIG. 3 thereby maintaining a closed trough 31.

Figure 6:
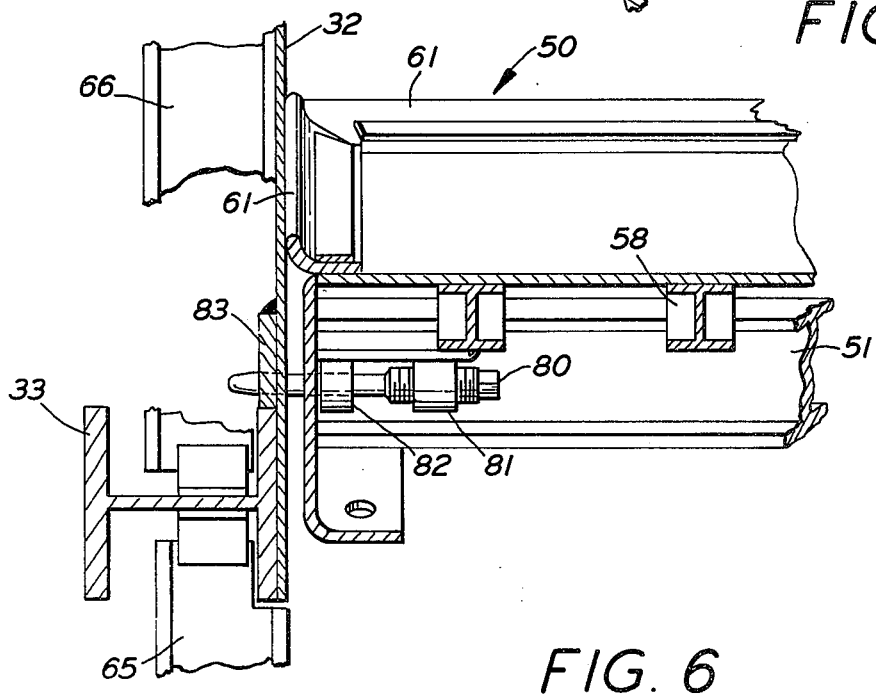
FIG. 6 is an enlarged detail drawing showing the manner in which the head of the ram assembly may be locked in place for maintenance or replacement of the ram assembly.

Carriage 36 is guided laterally during its movement by lower guide beams 65 and upper guide beams 66 which generally run parallel to support member 34. A plurality of wheels or casters 68 (FIG. 4) are mounted on the sides of carriage 36 so that when the carriage is centered on its support beams 37, there is a close clearance between wheels 68 and lower beams 65. Then as the carriage moves angularly upward, the upper guide beams 66, which are offset by a thickness of trough side plates 32 (FIG. 6) prevent lateral movement which could occur in situations of unsymmetrical load resistance.

Figure 10:
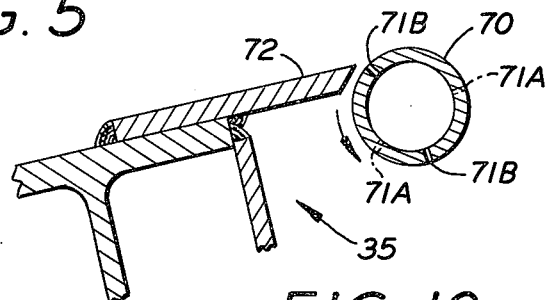
FIG. 10 is an enlarged view of the apparatus for cooling fires shown in FIG. 3.

When refuse or other combustible materials are stored in and moved through the pit, ignition of these materials in the pit is a possibility. In order to counteract such an occurrence, each pusher assembly is provided with a cooling system at the end of the upper portion of support member 34. A spray pipe 70 is environmentally shown in FIG. 3 and is shown in more detail in FIG. 10. Pipe 70 is rotatably mounted in trough side plates 32 such that when a shutoff cock (not shown) is in the off position, pipe 70 is rotated so that the two outlet holes 71 are in the 71A position below and protected by a cover plate 72 fixed to support member 34. This prevents the holes 71 from packing with material when not in use. In case of fire in the pit, the spray would be turned on rotating pipe 70 approximately 90° to the 71B position in FIG. 10 thereby flooding water over the various assemblies to provide cooling and prevent damage. Excess water would eventually leak by the fabric strips 61 and down to the gallery area or deck 73 of the pit trough 31 where drains could carry it away. The gallery area 73 is, of course, completely enclosed and away from the refuse due to the sealing effect of the support members 34, carriage cover plates 42 and pusher head assemblies 50. It is this area where the hydraulic and electrical controls are located and also where the carriage 36 and other members of the pusher assembly 35 may be serviced.

When the carriage 36 is in its retracted position, routine maintenance can be performed thereon from the gallery inasmuch as the sides and bottom thereof are generally open. More major maintenance can be performed on the carriage or hydraulic cylinder without shutting down the remainder of the system in a manner shown in FIGS. 3 and 6. With the carriage 36 in its fully retracted position, the head assembly 50 can be locked in place by inserting a plurality of lock pins 80 (FIG. 6) through threaded collars 81, through guide bushings 82 and through matching holes in trough side plates 32 and retainer lugs 83 welded to stanchions 33. Then the bolts 54 may be removed to unfasten the carriage 36 from the head assembly 50.

A ramp or skid 84 may then be bolted to lugs 85 at the back end of each beam 37 to provide a continuous path for the carriage assembly to be removed to the gallery or deck 73. After disconnecting the trunnion bearing plate 86 and the pin 56 to free cylinder 44 from pedestal 46 and head 50, respectively, as well as disconnecting the hydraulic hoses, the cylinder may be pulled up against carriage I-beams 41 by chain hoists 88, somewhat schematically shown in FIG. 3, to free the trunnion 45 from its bushing. Then the carriage and cylinder may be lowered down the ramp until a stop 89 on skid 84 is contacted. At that time the skid 84 may be disconnected from beams 37 and lowered, as by chain hoist 90, to the deck 73 for each of maintenance.

The gallery or deck area is kept free of refuse because of the closure afforded by cover deck 63 of support member 34 and the head assembly 50 which has remained in place. Thus, operation of the system may go on uninterrupted with only a minor loss of efficiency due to material having to be pushed over the top of the idle pusher space.

The gallery area 73 also represents a convenient location for the hydraulic controls for each cylinder 44, the details of which are best shown in the schematic FIG. 7. Each pusher assembly 35 is provided with an independent hydraulic control system generally indicated by the numeral 100. A positive displacement oil pump 101 is driven at a constant speed by motor 102 to draw oil from and return oil to a tank 103. A conventional two position solenoid-operated four-way valve 104 reverses the travel of the piston 105 on rod 106 of cylinder 44. The system can be electrically controlled in a conventional manner (not shown) such that the pushers can be synchronized with each other as desired and a time delay can be preset between the finish of one cycle and the start of the next. The horsepower of motor 102 and setting of relief valve 108 can be selected considerably above the values normally required to run the system in order to provide ample margin in the event particularly heavy material is encountered, as would be well within the knowledge of one skilled in the art.

In order to prevent the pressure from building up to a point such that it would be relieved through valve 108 near the end of each stroke resulting in a considerable increase in power consumption, there are provided two relief ports 110 in the walls of cylinder 44 which are uncovered near the end of the travel of piston 105 in each direction. Pressure is thereby relieved to the return line through check valves 111 to hold power consumption at a minimum. Upon a change in position of the four-way valve 104, check valves 111 close to preclude oil from bypassing piston 105 in the wrong direction.

The end of each retract stroke of piston 105 is cushioned by the oil between piston 105 and the cylinder cap with the fluid being forced to discharge to the return line through an adjustable needle valve 112 after the piston 105 has covered rear port 110. Valve 112 is adjusted to result in a small back pressure on piston 105 so that as piston 105 approaches the end of the stroke and port 110 is uncovered dropping the pressure to the right of piston 105 as seen in FIG. 7, movement thereof would momentarily stop until the pressure on the other side of piston 105 is bled away through valve 112. Once this pressure is removed, the weight of the carriage 36 as well as the refuse material would push the piston to its fully retracted position to await the next stroke. A check valve 113 is also provided to permit fluid to bypass valve 112 when the piston 105 is being driven in the foward direction.

It should thus be evident that each superimposed pusher assembly 35 is capable of independent and timed operation through conventional electrical controls (not shown) and its independent hydraulic system. Of course, a common hydraulic system with special valving for independent operation could be developed without departing from the spirit of the invention. In any event, such independent operation enables the conveying system to be operated in a variety of modes to effect multiple types of material conveyance. For example, during a period of a low volume of material in the pit, the trucks could be instructed to dump the material near the front (closest to shredder 23) of the pit and then only the front pusher assemblies operated. If most of the material is located in the rear of the pit, or if it is desired to move the material faster from the rear of the pit, all the pusher assemblies could be activated in unison. If it should be desirable to lower the level of the material in the pit evenly along its length, the operation of the pusher assemblies could be synchronized in a manner such that alternate pusher assemblies are retracting while the others are advancing resulting in a slower but more even advancement of the material out of the pit. Dependent on the characteristics of material being conveyed (heavy, sticky, etc.) and particularly the bridging characteristics thereof, that is, the propensity of the material to tend to bridge from one wall 30 of the pit to the other thereby not dropping into the trough 31, the operation of the pusher assemblies can be synchronized and timed to meet current pit conditions. In addition, adverse bridging is also avoided because the assemblies 35 ride on beams 37 and members 34 which are mounted at an angle. As previously described, support members 34 are shown as mounted at an angle of approximately 12° from horizontal. While such angle is not critical, it is best to have a certain angularity in the movement of the assemblies 35 to put a vertical component of movement in the refuse material increasing the agitation around the bottom of the pit to avoid the bridging just described. Similarly, if the pusher assemblies were not angled, but rather horizontally movable, the pit would have to be made much longer and/or deeper to achieve the same storing capacities. If too great an angle of inclination were designed, an excess vertical component would exist resulting in a loss of efficiency and a potential undue load would be placed on cylinders 44 and thus, in most instances the angle should not exceed 45°.

In the event that materials with extreme bridging characteristics are encountered such that the agitating action of the angularly mounted pusher assemblies just described does not totally eliminate bridging, braced extension members (not shown) could be fixed to each side of face 60 and extend angularly upward into the material in a manner well within the knowledge of one skilled in the art. Then upon movement of the pusher assemblies, the extension members would slice up and otherwise further agitate the material along each side of trough 31 thereby preventing adherance of the material to the trough.

It should also be evident that the conveyor unit of pusher assemblies just described need not be limited for use in the bottom of a refuse pit or a refuse disposal system. The pusher assemblies could well be used in any situation which requires storage of a material for subsequent controlled removal, such as might be found in a grain bin, or could be utilized for any conveying application for a solid or semi-solid material such as ores or the like.

When used in the environment of the refuse handling system 20 shown in FIGS. 1 and 2, the material is moved from pusher assembly to pusher assembly at a controlled rate and is dropped by gravity into a distribution hopper 120 which has, in the embodiment shown, three sloped bottoms 121 and wedge shaped deflectors 122 to aid in directing the material toward the shredder input conveyors 24 and prevent pocketing of the material in the space between the conveyors. Conventional rack and pinion shut-off gates 123 are mounted on the distribution hopper 120 at the inlet of each conveyor 24. These gates function primarily to shut off material to selective of the conveyors 24 in the event that one of the conveyors 24 were out-of-service for maintenance. In most instances, however, the material from the pit would be uniformly fed to all three shredders 23 for conventional processing for ultimate incineration.

The carriage assemblies 35, which taken together form a conveyor in the bottom of trough 31 of pit 21, are quite large and heavy with the pushing face 60 of each carriage being in practice two to three feet high and nine or more feet wide. As such, the pushers are quite capable of moving large refuse items to the shredders 23. However, in the event that extremely large and bulky items are brought to the system, items such as refrigerators and the like which in a municipal refuse system are usually picked up only at special times and which represent a rather small percentage of the total volume, the hydraulic shear 22 can be utilized to relieve the load on both the carriage assemblies 35 and the shredders 23.

The details of the hydraulic shear 22 described herein are shown in FIGS. 8 and 9. The shear 22 includes a rigid frame 130 to which is bolted a cylinder support block 131. A large hydraulic cylinder 132 is held by block 131 and has a piston rod 133, the end of which is bolted to the knife head 134. The knife head 134 is guided for reciprocation within the frame 130 by a mating sliding engagement with tracks 135 mounted on frame 130. The knife head 134 is also provided with a plurality of horizontally oriented blades 136 and generally vertically oriented blades 138. As shown in FIG. 9, a hopper 139 is adapted to receive the material to be sheared which material may be systematically transferred down a ramp 140 of a conventional vibratory feeder (the details of which are not shown) to the shearing table 141. The feeder is actuated when the piston rod 133 is in its rearward position (to the right in FIGS. 8 and 9) which locates the blades 136 and 138 proximate a position underneath a seal strip 142 which maintain the refuse material within hopper 139. Then upon actuation of cylinder 132, the material is compressed until it is sheared as the blades 136 and 138 come into close contact with stationary blades 143 and 144 respectively mounted at the end of shearing table 141 to sever the refuse material to a size capable of facile transfer by assemblies 35 as previously described. Guide covers 145 which move with head 134 can be utilized to keep the refuse material from hampering the sliding motion of head 134 on tracks 135.

It should thus be evident that a system described herein is capable of complete disposal of a variety of refuse materials. Large material can first be sheared and transferred to a storage pit. Normal refuse is placed directly in the pit from which it is systematically transferred to shredding and incinerating operations thus substantially improving the material transfer and refuse disposal art.

What is claimed is:

1. In a system for handling refuse material and the like, a pit for storing the material, said pit having an open top, downwardly converging side walls, and a trough meeting said side walls at their closest point of convergence; said trough including two generally vertical side plates; columns supporting said side plates; a plurality of adjacent upwardly angled support members each supported by said columns and defining the bottom of said trough; a cylinder mounted on each said support member; a piston and piston rod in each said cylinder; a carriage having wheels riding on each said support member; and pusher means mounted on said carriage and connected to said piston rod for moving material from one said support member to an adjacent said support member in an upwardly angled direction to avoid bridging of the material between the generally vertical side plates of said trough.

2. In a system according to claim 1, said pusher means including pusher head means to contact the material upon movement of said carriage, and means to removably mount said pusher head means to said piston rod.

3. In a system according to claim 2, a gallery area below said support members to receive said carriage and said cylinder for maintenance.

4. In a system according to claim 3, said gallery area being kept free of material by said support members and said pusher head means.

5. A conveyor according to claim 1 further comprising means to laterally guide each said carriage as it moves along said support member.

6. A conveyor for moving material comprising a plurality of upwardly angled adjacent stationary support members, means to independently mount each said support member, each said support member including a first portion capable of receiving the material thereon and a second portion located beneath and spaced from the first portion of an adjacent support member, a carriage supported by said second portion of each said support member in the space between adjacent support members and capable of moving the material, and means to reciprocate each said carriage longitudinally from said second portion of said support member to the first portion of said support member independently to provide selective operation for each said carriage to move material from the first portion of one support member to the first portion of the adjacent support member, said means to reciprocate including a hydraulic cylinder having a piston and a piston rod, said piston moving in said cylinder from a beginning of a stroke to an end of the stroke, means to attach said piston rod to said carriage, a supply tank, a fluid in said supply tank, and means to transfer the fluid from said supply tank selectively to each side of said piston to reciprocate said piston rod, said cylinder including relief ports uncovered by said piston near the end of each stroke.

7. A conveyor according to claim 6, each said carriage including a head assembly to push material along each said support member.

8. A conveyor according to claim 7 wherein said means to reciprocate includes a cylinder mounted on each said support member, each said cylinder having a piston rod, and means to removably mount said piston rod to each said head assembly.

9. A conveyor according to claim 8 including means to remove each said carriage and each said cylinder from each said support member.

* * * * *